US008802044B2

(12) United States Patent
Vernoux et al.

(10) Patent No.: US 8,802,044 B2
(45) Date of Patent: Aug. 12, 2014

(54) PURIFICATION STRUCTURE INCLUDING A CATALYSIS SYSTEM SUPPORTED BY A ZIRCON IN REDUCED STATE

(75) Inventors: Philippe Vernoux, Rochetaillee sur Saone (FR); Abdelkader Hadjar, Saint-Etienne (FR); Agnes Princivalle, Lagnes (FR); Christian Guizard, Cournonterral (FR)

(73) Assignees: Saint-Gobain Centre de Recherches et d'Etudes Europeen, Courbevoie (FR); Centre National de la Recherche Scientifique, Paris (FR)

( * ) Notice: Subject to any disclaimer, the term of this patent is extended or adjusted under 35 U.S.C. 154(b) by 267 days.

(21) Appl. No.: 13/139,736

(22) PCT Filed: Dec. 16, 2009

(86) PCT No.: PCT/FR2009/052576
§ 371 (c)(1),
(2), (4) Date: Jun. 15, 2011

(87) PCT Pub. No.: WO2010/076509
PCT Pub. Date: Jul. 8, 2010

(65) Prior Publication Data
US 2011/0250112 A1 Oct. 13, 2011

(30) Foreign Application Priority Data
Dec. 17, 2008 (FR) ................................ 08 58720

(51) Int. Cl.
| B01J 23/00 | (2006.01) |
| B01J 21/00 | (2006.01) |
| B01D 53/56 | (2006.01) |
| B01J 20/00 | (2006.01) |

(52) U.S. Cl.
USPC ........ 423/213.2; 502/178; 502/302; 502/303; 502/304; 502/324; 502/326; 502/327; 502/328; 502/329; 502/330; 502/331; 502/332; 502/333; 502/334; 502/335; 502/336; 502/337; 502/338; 502/339; 502/340; 502/341; 502/342; 502/343; 502/344; 502/345; 502/346; 502/347; 502/348; 502/349; 502/350; 502/351; 502/352; 502/353; 502/354; 502/355; 502/415; 502/439; 502/527.18; 502/527.19

(58) Field of Classification Search
USPC ......... 502/178, 302–304, 324, 326–355, 415, 502/439, 527.18, 527.19; 423/213.2
See application file for complete search history.

(56) References Cited

U.S. PATENT DOCUMENTS

| 5,134,109 | A | 7/1992 | Uchiyama et al. |
| 5,275,997 | A | 1/1994 | Ganguli et al. |
| 6,492,298 | B1 | 12/2002 | Sobukawa et al. |
| 7,169,735 | B2 | 1/2007 | Sagae |
| 7,351,382 | B2 * | 4/2008 | Pfeifer et al. ................. 422/177 |
| 7,871,452 | B2 * | 1/2011 | Yamada et al. ................. 55/523 |
| 8,038,956 | B2 * | 10/2011 | Li ................................. 422/180 |
| 8,114,354 | B2 * | 2/2012 | Li ................................. 422/180 |
| 8,133,841 | B2 * | 3/2012 | Noda et al. .................... 502/439 |
| 2002/0054844 | A1 * | 5/2002 | Pfeifer et al. ............. 423/239.1 |
| 2003/0050189 | A1 | 3/2003 | Morikawa et al. |
| 2004/0033175 | A1 | 2/2004 | Ohno et al. |
| 2004/0067176 | A1 * | 4/2004 | Pfeifer et al. ................. 422/177 |
| 2005/0095188 | A1 * | 5/2005 | Matsumoto et al. ....... 423/213.2 |
| 2005/0261125 | A1 | 11/2005 | Sagae |
| 2006/0057046 | A1 * | 3/2006 | Punke et al. ............... 423/215.5 |
| 2007/0066479 | A1 | 3/2007 | Takeshima et al. |
| 2008/0207438 | A1 * | 8/2008 | Suzuki et al. ................. 502/302 |
| 2009/0087365 | A1 * | 4/2009 | Klingmann et al. ....... 423/213.5 |
| 2009/0170689 | A1 | 7/2009 | Hatanaka et al. |
| 2009/0232714 | A1 * | 9/2009 | Abe et al. ..................... 422/180 |

FOREIGN PATENT DOCUMENTS

| EP | 0 406 896 A1 | 1/1991 |
| EP | 1 040 870 A2 | 10/2000 |
| EP | 1 287 876 A2 | 3/2003 |
| EP | 1 338 322 A1 | 8/2003 |
| EP | 2 000 202 A1 | 12/2008 |
| JP | 2005-125254 | 5/2005 |
| JP | 2005-262184 | 9/2005 |
| JP | 2006-7142 | 1/2006 |

OTHER PUBLICATIONS

International Search Report issued on Jun. 17, 2010, in Patent Application No. PCT/FR2009/052576.
Madona Labaki et al. "Thermal Analysis and Temperature-Programmed Reduction Studies of Copper—Zirconium and Copper—Zirconium—Yttrium Compounds", Thermochimica Acta, vol. 427, No. 1-2, XP 025387003 Mar. 1, 2005, pp. 193-200.
Jorge D. A. Bellido et al. "Effect of the $Y_2O_3$—$ZrO_2$ Support Composition on Nickel Catalyst Evaluated in Dry Reforming of Methane", Applied Catalysis A: General, vol. 352, No. 1-2, XP 025800245, 2009, pp. 179-187.

* cited by examiner

Primary Examiner — Cam N. Nguyen
(74) Attorney, Agent, or Firm — Oblon, Spivak, McClelland, Maier & Neustadt, L.L.P.

(57) ABSTRACT

The invention relates to a filtration structure, for filtering a gas coming from a diesel engine, which is laden with gaseous pollutants of the nitrogen oxide $NO_x$ type and with solid particles, of the particulate filter type, said filtration structure being characterized in that it includes a catalytic system comprising at least one noble metal or transition metal suitable for reducing the $NO_x$ and a support material, in which said support material comprises or is made of a zirconium oxide partially substituted with a trivalent cation $M^{3+}$ or with a divalent cation $M'^{2+}$, said zirconium oxide being in a reduced, oxygen-sub-stoichiometric, state.

17 Claims, No Drawings

PURIFICATION STRUCTURE INCLUDING A CATALYSIS SYSTEM SUPPORTED BY A ZIRCON IN REDUCED STATE

The present invention relates to the field of structures for purifying a gas laden with gaseous pollutants essentially of the $NO_x$ type. More particularly, the invention relates to honeycomb structures, especially those used for treating the exhaust gases of a diesel engine, said structures incorporating a catalytic system for depolluting said pollutant species.

The techniques and problems associated with the purification of polluted gases, especially those output by the exhaust lines of gasoline or diesel automobiles, are well known in the art. A conventional three-way catalyst serves for jointly treating the pollutants $NO_x$, CO and HC and for converting them into inert and chemically harmless gases, such as $N_2$, $CO_2$ and $H_2O$. However, the system does not achieve a very high efficiency except by the richness of the air/fuel mixture being continuously regulated. It is thus known that the slightest departure from the stoichiometry of said mixture leads to a large increase in pollutant emissions.

To solve this problem, it is necessary to incorporate materials into the catalyst that temporarily enable the $NO_x$ to be fixed (materials often called $NO_x$ traps in the art) when the air/fuel mixture is lean (i.e. a fuel-deficient or substoichiometric mixture). The desorption of the $NO_x$ trapped on the catalyst and their catalytic reduction to gaseous nitrogen $N_2$ take place in the presence, on the catalyst allowing the reduction, of a sufficient quantity of reducing species in the form of hydrocarbons or carbon monoxide CO or gaseous hydrogen $H_2$, it being possible for the gaseous hydrogen itself to be obtained by a catalytic reaction between the hydrocarbons HC and steam and/or carbon dioxide or between CO and steam.

At the present time, the materials that are used for adsorbing $NO_x$ are in general alkali metal or alkaline-earth metal oxides, in particular barium oxide, a material presently considered to be the most effective in this field.

However, these solutions pose chemical stability problems since the $NO_x$ traps of barium oxide are rapidly poisoned by the sulfur oxides ($SO_x$) that are also contained in the exhaust gases, especially those from a diesel engine. Moreover, since barium precursors are difficult to disperse on the support material, it is necessary to provide large amounts thereof. This lowers the accessibility of the noble metals of the catalytic system through a barium oxide "covering" effect. One possible, but too expensive, solution would consist in increasing the amount of noble metals in the system. Furthermore, these barium-based NOx trap systems pose hygiene and environmental problems, since barium is listed as a heavy metal.

Alternative $NO_x$ reduction systems are known, these using a support made of alumina having a high specific surface area. However, because of its insufficient thermal stability, this type of support cannot be used in the present application.

$NO_x$ reduction systems incorporating a zirconia-type support material are also known, but the performance of these systems is poor. Thus, as is known, for example as illustrated in patent U.S. Pat. No. 5,232,890, a zirconia may be used as catalyst support in 3-way $NO_x$ reduction systems. The zirconia employed, as described in the above application, is a zirconia stabilized by doping with yttrium, optionally including additions of cerium oxide or lanthanum oxide. In such systems, the zirconia serves merely as catalyst support, but it does not allow $NO_x$ storage.

In the public documents relating to this subject, it is commonly indicated that, in order for such a system to operate correctly, it is also necessary to employ materials based on the oxides of alkali or alkaline-earth metals, generally barium oxide, as $NO_x$ traps.

The object of the present invention is to provide a solution for solving the problems described above, in particular as regards the $NO_x$ storage function. In particular, one of the aims of the present invention is to provide a structure for purifying a polluted gas, in particular a structure for filtering the exhaust gas, coming from a diesel engine, laden with gaseous pollutants and with solid particles, which can operate in the absence of specific $NO_x$ traps based on alkali metal or alkaline-earth metal oxides, particularly barium oxide.

More precisely, the invention consists of a filtration structure, for filtering a gas coming from a diesel engine, which is laden with gaseous pollutants of the nitrogen oxide $NO_x$ type and with solid particles, of the particulate filter type, said structure comprising an array of longitudinal adjacent channels of mutually parallel axes separated by porous filtering walls made of said porous inorganic material, said channels being alternatively plugged at one or other of the ends of the structure so as to define inlet channels and outlet channels for the gas to be filtered, and so as to force said gas to pass through the porous walls separating the inlet channels from the outlet channels, said filtration structure being characterized in that it includes a catalytic system comprising at least one noble metal or transition metal suitable for reducing the $NO_x$ and a support material, in which said support material comprises or is made of a zirconium oxide partially substituted with a trivalent cation $M^{3+}$ or with a divalent cation $M'^{2+}$, said zirconium oxide being in a reduced, oxygen-sub-stoichiometric, state.

Thus, although the documents cited above have already mentioned the use of a zirconia partially substituted with cations of lower valency, for example yttrium cations $Y^{3+}$, no particular prior treatment of such a material is mentioned for the purpose of making it capable of efficiently trapping nitrogen oxides $NO_x$ in such a filtration structure.

Furthermore, the catalytic system is advantageously chosen so as to be also suitable for oxidizing the polluting species of the HC (hydrocarbon), CO or $H_2$ type. Without being limited thereto, such a catalytic system comprises at least one precious metal chosen from Pt and/or Pd and/or Rh and/or Ag and/or Au and/or transition metals, especially Cu, Fe, Ni, Co, and transition metal oxides such as $Mn_2O_3$ and $Co_3O_4$.

Alternatively, it is possible according to the invention to use, complementarily, another catalytic system suitable for oxidizing the polluting species of the HC, CO or $H_2$ type.

In one example of a filtration structure according to the invention, the support material satisfies the formula: $(ZrO_{2-x})_{1-y}(M_2O_{3-x})_y$, M being a cation of valency 3 preferably chosen from the group formed by $Y^{3+}$ and $Sc^{3+}$ or the rare earths and y being strictly greater than 0 and strictly less than 2.

Preferably, y is less than or equal to 0.5, more preferably y is less than or equal to 0.25 and very preferably y is less than or equal to 0.1.

In another example of a filtration structure according to the invention, the support material satisfies the formula: $(ZrO_{2-x})_{1-y'}(M'O_{1-x})_{y'}$, M' being a cation of valency 2 preferably chosen from the group formed by $Ca^{2+}$ and $Sr^{2+}$ and y' being strictly greater than 0 and strictly less than 2.

Preferably, y' is less than 0.6, more preferably y' is less than 0.3 and very preferably y' is less than or equal to 0.15.

In the above formulae, the reduced filtration structure according to the invention is such that x is less than 0.5, preferably less than 0.1 and very preferably less than 0.05. Advantageously, x is greater than 0.005, preferably greater than 0.01.

This support material of the zirconia-based catalytic system according to the invention preferably has, even after a calcination between 800 and 1000° C., a specific surface area of at least 5 m²/g, preferably at least 10 m²/g and even at least 50 m²/g.

The zirconia forming all or part of the support material may be obtained by doping it in various ways, substituting the zirconium atoms with cations of transition metals of lower valency, such as $Y^{3+}$, $Sc^{3+}$, $Ca^{2+}$, $Sr^{2+}$ or rare earths. The ionic conductivity is preferably between 1 and $10^{-4}$ S/cm in the 150 to 800° C. temperature range.

In the context of the present description, the porous inorganic material has an open porosity, conventionally measured by mercury porosimetry, of greater than 10%, preferably greater than 20% or even greater than 30%. Too low a porosity of the material constituting the filtering walls leads to too high a pressure drop, whereas too high a porosity of the material constituting the filtering walls leads to insufficient filtration efficiency.

For example, the porous inorganic material comprises or is made of an electronically conducting inorganic material of the carbide type, for example SiC, or a silicide, for example $MoSi_2$ or a boride, for example $TiB_2$, or a material of the $La_{1-x}Sr_xMnO_3$ family or of the mixed cerium gadolinium oxide (CGO) type. The advantage of such structures based on electronically conducting porous inorganic materials is that they enhance the activity of the catalytic system by an electrochemical effect, according to the principles as described for example in patent U.S. Pat. No. 6,878,354.

According to one possible embodiment, the porous inorganic material is based on silicon carbide SiC, preferably recrystallized at a temperature between 2100 and 2400° C. In particular, the inorganic material may be based on doped SiC, for example SiC doped with aluminum or nitrogen, and in such a way that its electronic resistivity is preferably less than 20 ohms.cm, more preferably less than 15 ohms.cm and even more preferably less than 10 ohms.cm at 400° C. The expression "based on SiC" is understood in the context of the present description to mean that the material consists of at least 25% by weight, preferably at least 45% by weight and very preferably at least 70% by weight of SiC.

According to another possible embodiment, the porous inorganic material is based on cordierite or aluminum titanate.

According to another aspect, the invention relates to a powder that can be used as support material in a filtration structure as described above, said powder comprising particles of zirconium oxide partially substituted with a cation M or M', which contain no precious metals of the Pt, Pd, Rh, Ag or Au type, and no transition metals, especially Cu, Fe, Ni or Co, said substituted zirconium oxide being in the reduced, oxygen-sub-stoichiometric, state and satisfying the formula: $(ZrO_{2-x})_{1-y'}(M_2O_{3-x})_{y'}$, M being a cation of valency 3 preferably chosen from the group formed by $Y^{3+}$, $Sc^{3+}$ or the rare earths, and y being strictly greater than 0 and strictly less than 2 or satisfying the formula: $(ZrO_{2-x})_{1-y'}(M'O_{1-x})_{y'}$, M' being a cation of valency 2 preferably chosen from the group formed by $Ca^{2+}$ and $Sr^{2+}$, y' being strictly greater than 0 and strictly less than 2 and x being less than 0.5, preferably less than 0.1 and very preferably less than 0.05.

In particular, x may be greater than 0.005, or even greater than 0.01.

In the powder described above, the reduced state of the partially substituted zirconium oxide may be obtained by a heat treatment at a temperature above 400° C. in a reducing atmosphere or by an electrochemical treatment consisting in biasing the material by applying a bias voltage or current thereto.

The use of a powder as described above is advantageous as support material for an $NO_x$ reduction catalyst in a filration structure of the particulate filter type as described above.

In particular, the powder makes it easier to obtain a catalytic system as described above, especially characterized in that it includes at least one noble or transition metal suitable for $NO_x$ reduction and said support material, as described above, comprising or made of zirconium oxide in a reduced state partially substituted with a trivalent cation $M^{3+}$ or divalent cation $W^{2+}$.

According to one possible action mechanism, without such a mechanism being considered to be any particular theory, the catalyst used allows a selective observation reaction to occur, in which the $NO_x$ are oxidized to $NO_2$. The $NO_2$ is then, surprisingly, and never observed hitherto, captured on the catalyst support in a $Zro(NO_3)_2$ form. Such a phenomenon occurs in particular during phases in which the engine is operating with a lean, or fuel-deficient, mixture.

According to another aspect, the catalyst used also allows, during subsequent phases, a reduction reaction, in which the $NO_x$ (NO and $NO_2$) are reduced to $N_2$, in particular during phases in which the engine is operating with a fuel-rich mixture, i.e. in a reducing atmosphere. The trials carried out by the Applicant have in fact shown that during such phases, the zirconia-based support releases the nitrogen oxides stored beforehand. Without this being considered as definitive, the proposed mechanism could be the following:

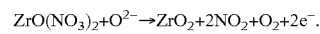

$$ZrO(NO_3)_2 + O^{2-} \rightarrow ZrO_2 + 2NO_2 + O_2 + 2e^-.$$

The nitrogen oxides, released en masse and concentrated close to the catalyst, are then immediately reduced efficiently to gaseous nitrogen $N_2$ by said catalyst.

According to the invention, the metal catalysts may be deposited conventionally by impregnating the surface of a zirconia powder as described according to the invention, for example using processes such as those described in particular in U.S. Pat. No. 5,884,473.

Compared with the structures known up to now, such an arrangement has many advantages, among which are the following:

- by introducing the catalytic system, the support material of which acts as an $NO_x$ trap, it is advantageously possible for the developed catalyst surface accessible to the pollutants to be greatly increased and consequently for the probability of contact and exchange between the reactive species to be likewise increased;
- the support material formed according to the invention also has a very high thermal stability compared with support materials of the alumina type, in particular because of better resistance to the sintering of the metal catalyst particles deposited that are in contact with the oxygen vacancies of the support material;
- the support material formed according to the invention has a high level of reactivation in a fuel-rich medium compared with the prior solutions;
- a limited number of system constituents have to be deposited on the support, thereby greatly reducing the dependence of the system performance on the conditions under which the catalyst is deposited on the support;
- higher catalytic efficiency and better dispersion of the metal catalysts on the support material, which can be achieved because of the absence of additional substance useful for $NO_x$ storage; and the catalytic system according to the invention, since it contains no barium, is therefore much less sensitive to the presence of sulfur oxides ($SO_x$) in the gases to be treated.

The present invention is most particularly applicable in filtering-wall structures used for the purification, and most effectively for the filtration, of the exhaust gas of a diesel engine. Such structures, generally called particulate filters, comprise at least one and preferably a plurality of honeycomb monoliths joined together with a jointing cement. Unlike the purification devices described above, in such filters said monoliths comprise an array of adjacent ducts or channels of mutually parallel axes separated by porous walls, said ducts or channels being closed off by plugs at one or other of their ends in order to delimit inlet ducts opening onto a gas intake face and outlet ducts opening onto a gas discharge face, in such a way that the gas passes through the porous walls. Examples of such structures, whether assembled or not, are for example described in EP 816 065, EP 1 142 619, EP 1 306 358 and EP 1 591 430.

According to a first possible embodiment, the porous inorganic structure is impregnated with an aqueous solution comprising zirconium particles having the features according to the invention, that is to say the support is a reduced zirconium oxide satisfying the formula: $(ZrO_{2-x})_{1-y}(M_2O_{3-x})_y$ or $(ZrO_2)_{1-y'}(M'O_{1-x})_{y'}$, M being a cation of valency 3 and M' being a cation of valency 2.

According to an essential feature of the invention, said substituted zirconia support is in a reduced form, i.e. has undergone a reduction treatment bringing it to an oxygen-deficient (or sub-stoichiometric) state, it being possible for said reduction treatment to be chosen according to the invention from all treatments known for this purpose and especially by heating in a reducing atmosphere, by electrochemical means, etc.

According to the invention, the reduced state of the support may be obtained in particular by a thermal reduction treatment, i.e. by a treatment at high temperature, for example between 400 and 1000° C., in a reducing atmosphere. Typically, said treatment may be carried out under a sufficient pressure, of at least 0.1 atm (1 atm=$10^5$ Pa) and preferably 1 atm, of $H_2$, optionally mixed with another, inert gas. The reduction treatment may also be carried out in a light-hydrocarbon, such as for example methane, propane or propene, reducing atmosphere or in carbon monoxide CO, within a temperature range between 400 and 1000° C. The duration of the heat treatment may be adapted to the initial particle size and/or specific surface area of the powder intended for deposition on the structure and/or to the temperature. This duration is in general at least 10 minutes and preferably 60 minutes or longer.

According to this first embodiment of the invention, the reduction treatment is carried out in a step prior to the impregnation of the structure with the substituted zirconia particles.

The structure comprising the support in a reduced state is then impregnated in one or more steps with the catalytic system or systems necessary for converting the $NO_x$ to $N_2$.

According to a second possible embodiment, the porous inorganic structure is this time firstly impregnated with an aqueous solution comprising doped-zirconia particles, certain zirconium atoms being substituted with cations of transition metals of lower valency (3 or 2) such as $Y^{3+}$, $Sc^{3+}$, $Ca^{2+}$ or $Sr^{2+}$ or rare earths, in order in the end to obtain a material having the formula mentioned above.

According to this second embodiment, the thermal reduction treatment is carried out this time on the structure impregnated with the support material, i.e. after the zirconia has been deposited. Typically, the reduction treatment may be carried out under the same conditions as those described above in the previous embodiment. After the heat treatment, the structure is impregnated in one or more steps with the catalytic system or systems necessary for converting the $NO_x$ to $N_2$. This second embodiment has the advantage of enabling the porous structure to be impregnated under conditions that are not necessarily reducing, for example in air.

In a third possible embodiment, the porous inorganic structure is impregnated with an aqueous solution comprising doped-zirconia particles, certain zirconium atoms being substituted with cations of transition metals of lower valency (3 or 2), such as $Y^{3+}$, $Sc^{3+}$, $Ca^{2+}$ or $Sr^{2+}$ or rare earths in order in the end to obtain a material having the abovementioned formula. After a calcination treatment, which may be optional, the structure is impregnated in one or more steps by the catalytic system or systems for converting the $NO_x$ to $N_2$.

According to a possible variant, the catalysts and the zirconia are deposited on the structure at the same time.

In this third embodiment, the thermal reduction treatment, which may be of the same type as that described above, is carried out on the structure already impregnated with a catalyst and its support material. This third embodiment enables the heat treatment to be carried out at a lower temperature, typically at a temperature between 400 and 600° C., because of the reducing activity of the catalytic metals.

Of course, any method or process known for reducing partially substituted zirconium oxide may be used in the context of the invention. For example, the reduced state of partially substituted zirconium oxide may also be obtained according to the invention by an electrochemical treatment consisting in biasing the material by applying a bias voltage or current thereto.

The invention and its advantages will be better understood on reading the following non-limiting embodiments and examples.

EXAMPLE 1

Comparative Example

According to this first example, cylindrical honeycomb monoliths made of recrystallized silicon carbide (SiC) were synthesized using conventional techniques already well known in the field and described for example in patent application EP 1 142 619 A1. Firstly, a blend of silicon carbide particles with a purity greater than 98% was produced in a mixer in accordance with the method of manufacturing an R-SiC structure described in patent application WO 1994/22556. The blend was obtained from a coarse SiC particle fraction (75 wt %), the median particle diameter of which is greater than 10 microns, and a fine particle size fraction (25 wt %), the median particle size of which is less than 1 micron. Within the context of the present description, the median diameter denotes the particle diameter below which 50% by weight of the population lies. Added to the portion of SiC particles, relative to their total mass, were 7 wt % of a pore-forming agent of the polyethylene type and 5 wt % of an organic binder of the cellulose derivative type.

Also added was water in an amount of 20 wt % of the sum of the above constituents and all the ingredients were mixed until a homogeneous paste was obtained, the plasticity of which enabled the formation of monoliths or extrusion through a die having a honeycomb structure.

After extrusion, the recrystallized SiC honeycomb monoliths were dried, stripped of the binder, plugged and fired in an inert atmosphere at a temperature of 2200° C. In detail, the optimum experimental conditions were the following: 20° C./hour temperature rise up to 2200° C. followed by a temperature hold for 6 hours at 2200° C.

These monoliths had a honeycomb structure, the characteristics of which are given in Table 1 below:

TABLE 1

| Geometry of the monolith channels | Square |
|---|---|
| Channel density | 180 cpsi (channels per square inch: 1 inch = 2.54 cm) |
| Wall thickness | 350 μm |
| Length | 5.08 cm |
| Diameter | 2.54 cm |
| Mass | About 14 g |
| Porosity | About 47% |
| Median pore diameter | About 15 μm |

In a second step, an aqueous suspension containing 3% by weight of zirconia powder doped with 8 mol % yttrium oxide was produced (zirconia powder basic grade TZ8Y having a specific surface area of 12 m$^2$/g and a density of 5.9) sold by Tosoh. According to one method of implementation similar to that described in patent U.S. Pat. No. 5,866,210, the monoliths were immersed in this solution so as to impregnate about 1.5% by weight of doped zirconia relative to the monolith. A drying operation was carried out at 40° C. followed by calcination at 500° C. in air, with a heating rate of 100° C./h and a hold of one hour at the maximum temperature.

In a third step, the monolith was impregnated with an aqueous dinitrodiamine platinum chloride solution.

The monolith was dried at 40° C. and then calcined at 500° C. in air, with a heating rate of 100° C./h and a hold of one hour at the maximum temperature.

In a fourth step, the monolith was impregnated with an aqueous rhodium nitrate solution, the monolith then being dried at 40° C. and calcined to 500° C. in air, with a heating rate of 100° C./h and with a hold of one hour at the maximum temperature.

The concentration of the precious metal solutions and the deposition process were adapted so as to form catalyzed monoliths the chemical analysis of which shows the following characteristics:

| Element | Pt | Rh |
|---|---|---|
| Amount (mg) per specimen and per monolith | 1.2 | 0.7 |

EXAMPLE 2

According to the Invention

The experimental protocol described above for Example 1 was entirely repeated in Example 2, except that this second series of monoliths underwent, after being impregnated with the supported catalyst, an additional reduction treatment in pure H$_2$ at 600° C. for 1 hour.

It was confirmed that the concentration of noble metals was unmodified by this additional step.

The analyses carried out show that the substituted and reduced zirconia substantially corresponded to the formula: $(ZrO_{2-x})_{1-y}(M_2O_{3-x})_y$, in which y is about 0.08 and x is close to 0.02.

The performance of the monoliths according to Examples 1 and 2 were measured at a temperature of 250 and 300° C. using the two synthetic gas mixtures given in Table 2, these being characteristic of the exhaust gases from a diesel engine operating with a lean mixture (mixture 1) and with a rich mixture (mixture 2).

TABLE 2

| Constituent | Mixture 1 (lean) | Mixture 2 (rich) |
|---|---|---|
| HC (ppmv) | 500 | 500 |
| NO$_x$ (ppmv) | 500 | 500 |
| H$_2$O (vol. %) | 10 | — |
| O$_2$ (vol %) | 6.7 | — |
| He (carrier gas) | Remainder | Remainder |

The test carried out was as follows: the lean gas mixture 1 firstly passed over the catalyzed monolith in an electric furnace at 250° C. and at 300° C. The composition of the gases passing through the monolith was alternated according to the following protocol. Firstly, mixture 1 for 3 minutes, then switching to gas mixture 2 (rich) for 2 minutes, then back to mixture 1 (for 3 minutes) and so on. The composition of the gases at the outlet of the furnace was analyzed after the system had stabilized so as to determine the amount of NO$_x$ converted to N$_2$.

The test as described above was carried out under the same conditions for each temperature, at 250° C. and at 300° C., on the monolith according to Example 1 (unreduced zirconia) and on the monolith according to Example 2 (reduced zirconia). The gas flow rate for both mixtures was 10 l/h.

Measurement sensors of the temperature thermocouple type were placed at about 5 mm from the exit surface of the monolith. The gases were analyzed at the exit of the reactor by IR and μGC analyzers.

The results given in Table 3 show that the monolith according to the invention (Example 2) has an appreciably higher degree of NO$_x$ conversion than the comparative filter (Example 1).

TABLE 3

|  | Filter according to Example 1 | Filter according to Example 2 |
|---|---|---|
| % volume conversion of NO$_x$ at 250° C. (average over ten 5-minute cycles) | 55 | 66 |
| % volume conversion of NO$_x$ at 300° C. (average over ten 5-minute cycles) | 47 | 57 |

The invention claimed is:
1. A filtration structure, comprising:
an array of longitudinal adjacent channels of mutually parallel axes separated by porous filtering walls comprising a porous inorganic material, wherein said channels are alternatively plugged at one or other of the ends of the structure so as to define inlet channels and outlet channels for a gas comprising NO$_x$ to be filtered, and so as to force said gas to pass through the porous filtering walls separating the inlet channels from the outlet channels,
wherein said filtration structure comprises a catalytic system comprising at least one noble metal or transition metal that reduces the NO$_x$ and a support material wherein the support material has formula (I):

wherein:
M is $Y^{3+}$, $Sc^{3+}$, or a rare earth cation of valency 3;
x is greater than 0.005 and less than 0.5; and
y is greater than 0 and less than 2; or
wherein the support material has formula (II):

$$(ZrO_{2-x})_{1-y'}(M'O_{1-x})_{y'} \qquad (II),$$

wherein:
M' is $Ca^{2+}$ or $Sr^{2+}$;
x is less than 0.5; and
y' is greater than 0 and less than 2.

2. The filtration structure of claim 1, wherein the gas further comprises a hydrocarbon, CO, or $H_2$, and the catalytic system oxidizes the hydrocarbon, CO, or $H_2$.

3. The filtration structure of claim 1, wherein the support material has formula (I).

4. The filtration structure of claim 3, wherein, in formula (I), y is less than or equal to 0.5.

5. The filtration structure of claim 3, wherein, in formula (I), x is less than 0.1.

6. The filtration structure of claim 3, wherein, in formula (I), x is greater than 0.01.

7. The filtration structure of claim 3, wherein, in formula (I), M is $Y^{3+}$.

8. The filtration structure of claim 3, wherein, in formula (I), M is $Sc^{3+}$.

9. The filtration structure of claim 3, wherein, in formula (I), M is a rare earth cation of valency 3.

10. The filtration structure of claim 1, wherein the support material has formula (II).

11. The filtration structure of claim 10, wherein, in formula (II), y' is less than 0.6.

12. The filtration structure of claim 10, wherein in formula (II), M' is $Ca^{2+}$.

13. The filtration structure of claim 10, wherein in formula (II), M' is $Sr^{2+}$.

14. The filtration structure of claim 1, wherein said support material has a specific surface area of at least 5 $m^2/g$.

15. The filtration structure of claim 1, wherein the catalytic system comprises:
at least one precious metal selected from the group consisting of Pt, Pd, Rh, Ag, and Au;
transition metals selected from the group consisting of Cu, Fe, Ni, and Co; and/or
a transition metal oxide selected from the group consisting of $Mn_2O_3$ and $CO_3O_4$.

16. The filtration structure of claim 1, wherein said filtration structure comprises silicon carbide (SiC), cordierite, or aluminum titanate.

17. A process of filtering a gas coming from a diesel engine, the process comprising:
filtering the gas through the filtration structure of claim 1.

* * * * *